No. 769,731. Patented September 13, 1904.

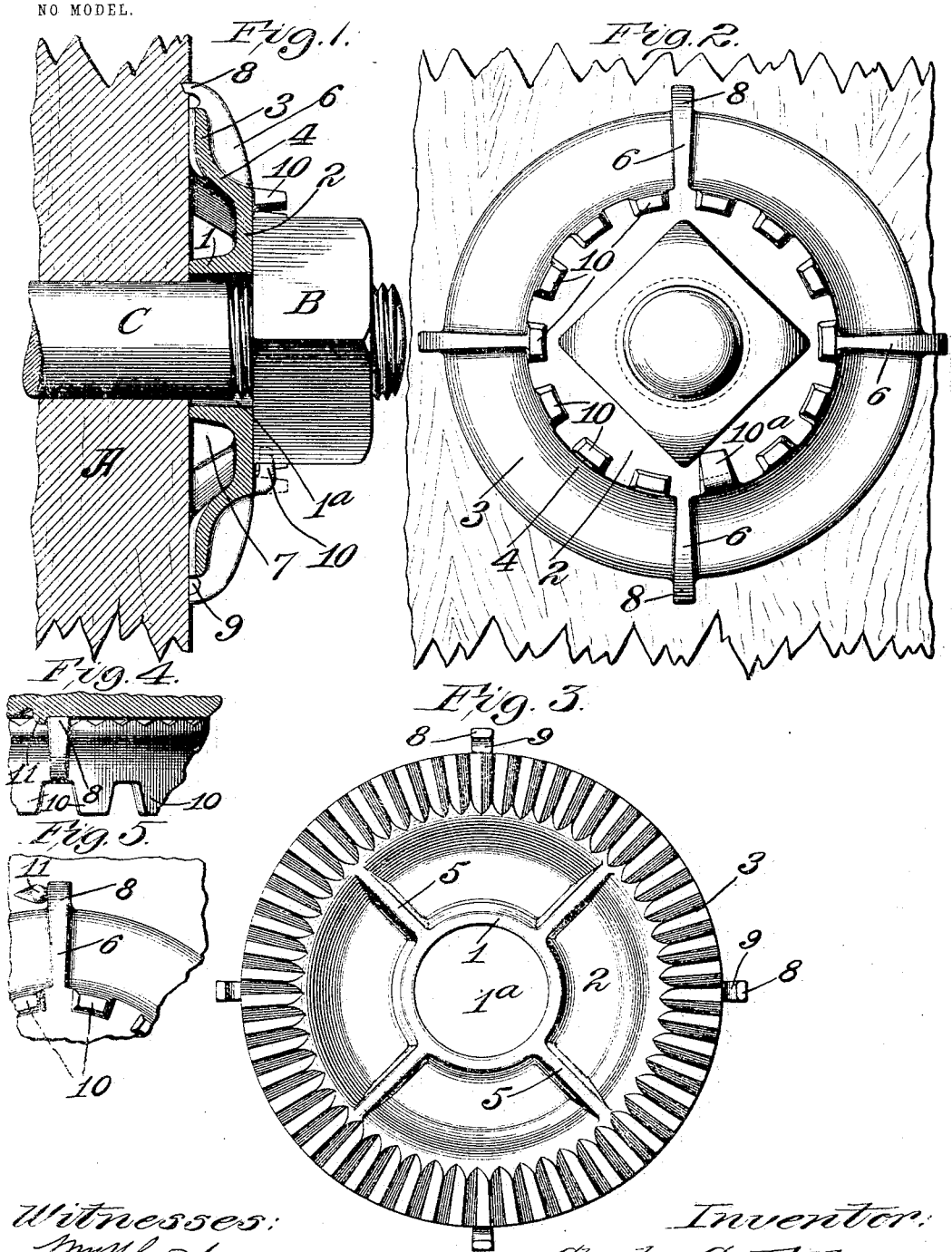

UNITED STATES PATENT OFFICE.

CHARLES G. ETTE, OF ST. LOUIS, MISSOURI.

WASHER.

SPECIFICATION forming part of Letters Patent No. 769,731, dated September 13, 1904.

Application filed March 19, 1904. Serial No. 198,918. (No model.)

*To all whom it may concern:*

Be it known that I, CHARLES G. ETTE, a citizen of the United States, residing at the city of St. Louis, State of Missouri, have invented a certain new and useful Improvement in Washers, of which the following is a full, clear, and exact description, such as will enable others skilled in the art to which it appertains to make and use the same, reference being had to the accompanying drawings, forming part of this specification, in which—

Figure 1 is a sectional elevation showing the washer applied to a wooden structure. Fig. 2 is a front view of the same. Fig. 3 is a rear view of the washer. Fig. 4 is a fragmentary detail illustrating the washer when applied to an iron structure, the portion of the washer illustrated being shown in side elevation; and Fig. 5 is a front elevational view of the parts illustrated in Fig. 4.

This invention relates to improvements in washers, and more particularly to a combined washer and nut-lock.

My object is to provide a washer of light and durable construction, said washer also having simple and efficient means for anchoring the washer and for locking a nut applied to a bolt used in conjunction with the washer.

To these ends and also to improve generally upon devices of the character indicated the invention consists in the matters hereinafter described and afterward pointed out in the claims.

Referring now more particularly to the drawings, the washer is illustrated as comprising a central ring 1, (through whose bolt-opening $1^a$ the bolt or tie-rod is adapted to pass in a well-understood manner;) an outer face-web 2, which extends laterally from the outer end of said ring; a laterally-extending rear or base web 3, which is ring-shaped and is of greater diameter than is the outer face-web 2, and a connecting-web 4, which extends rearwardly and outwardly from the outer edge of the outer face-web 2 to the inner edge of the base-web 3, the base-web 3 and the connecting-web 4 being spaced from the central ring 1 to produce, in effect, the hollowed-out portion 7, whereby lightness results. Rear strengthening-ribs 5 extend radially upon the inner side of the washer and connect the ring 1, the webs 2 and 3, and the connecting-web 4, and outer strengthening-ribs 6 upon the outer side of the washer extend radially and connect the webs 2 and 3 and the connecting-web 4.

In the present embodiment of my invention the outer strengthening-ribs 6 extend radially beyond the periphery of the body portion of the washer, and thus beyond the outer periphery of the base-web 3, these extending ends of the ribs 6 producing holding-fingers 8, which are adapted to anchor the washer in position. When the washer is applied to a wooden support A, one of these holding-fingers 8 is suitably bent, (as by being struck with the wrench with which the nut is applied or any other suitable tool,) the bent finger entering the wood, as illustrated in Fig. 1, and holding the washer against rotation. In order to facilitate the bending of the finger and to assist in pointing the same, the rib can be grooved beyond the periphery of the body portion of the washer, as illustrated at 9.

Extending outwardly from the web 2 are locking-lugs 10, which are arranged about the bolt-opening $1^a$. When these lugs are in their initial positions, the nut B can be applied to the bolt C and screwed home in the usual manner. After the nut has been applied, however, an appropriate lug 10—*e. g.*, the lug $10^a$—is struck and bent toward the bolt-opening, so that it engages the nut and prevents backward rotation of the same. The washer being firmly anchored to the supporting structure and the nut being locked by one of the locking-lugs 10, the nut is firmly locked against backward rotation. When it is desired to loosen the nut, the lug which has been holding it can be bent into its initial position or simply broken off, one of the other locking-lugs being employed when the washer is again used.

The present combined washer and nut-lock is preferably made as a malleable casting, so that it is cheaply and easily constructed, is light, and the holding-fingers and locking-lugs can be readily bent.

When the washer is applied to an iron support, as illustrated in Figs. 4 and 5, the holding-fingers 8 are not bent in order to engage the support; but a spur 11 is struck up from the support to lie against the finger, and thus prevent rotation of the washer.

I am aware that minor changes in the construction, arrangement, and combination of the several parts of my device can be made and substituted for those herein shown and described without in the least departing from the nature and principle of my invention.

Having thus described the invention, what is claimed as new, and desired to be secured by Letters Patent, is—

1. A combined washer and nut-lock comprising a body portion provided with a bolt-opening, strengthening-ribs upon said body portion and having flexible ends projecting beyond the periphery of said body portion to produce holding-fingers, and flexible locking-lugs upon said body portion and arranged about said bolt-opening, any of said lugs being adapted when bent to coöperate with a nut applied to a bolt extending through said bolt-opening to lock said nut; substantially as described.

2. A combined washer and nut-lock comprising a body portion provided with a bolt-opening, strengthening-ribs upon said body portion and having extensions projecting beyond the periphery of the same to produce holding members, and flexible locking-lugs upon said body portion and arranged about said bolt-opening, any of said lugs being adapted when bent to coöperate with a nut applied to a bolt extending through said bolt-opening to lock said nut; substantially as described.

3. As a new article of manufacture, a washer comprising a body portion provided with a bolt-opening, radially-disposed strengthening-ribs forming a part of the washer and terminating in anchor members disposed at the outer edge of the washer, and a flexible nut-engaging lug arranged at the edge of the bolt-opening; substantially as described.

4. A washer comprising a body portion provided with a bolt-opening, strengthening-ribs radially disposed on the washer and having their free ends projecting beyond the outer edge thereof to form anchor members, a series of corrugations on the side of the washer opposite to the strengthening-ribs, and flexible upstanding nut-engaging lugs arranged about the bolt-opening; substantially as described.

In testimony whereof I hereunto affix my signature, in the presence of two witnesses, this 15th day of March, 1904.

CHARLES G. ETTE.

Witnesses:
  EDW. SCHMIDDE,
  EDW. P. KYLE.